H. J. CHILDS.
Coffee-Pot.
No. 134,514. Patented Jan. 7, 1873.
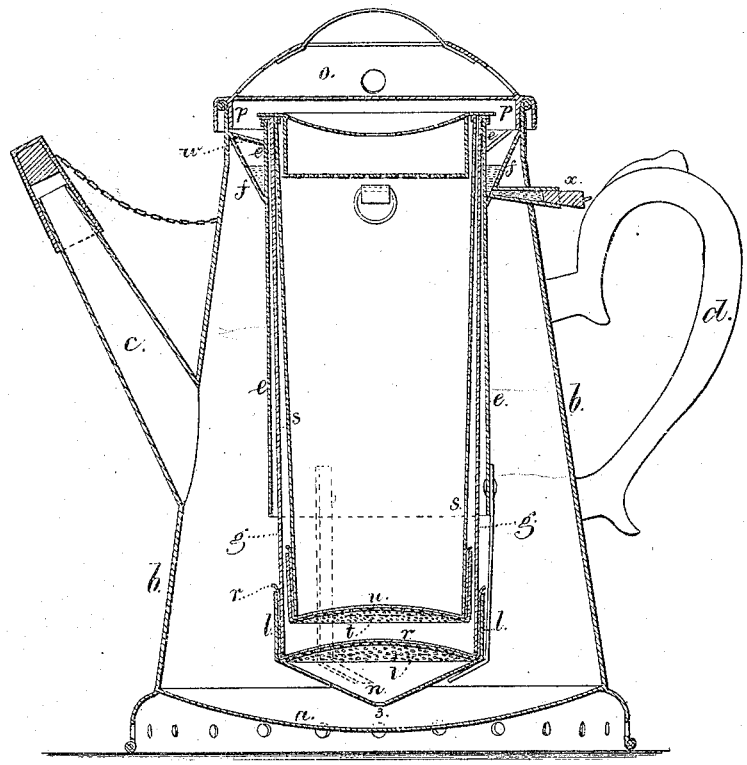
Witnesses
Chas H Smith
Geo T Pinckney
Inventor
Henry J. Childs
Lemuel W. Serrell
atty

UNITED STATES PATENT OFFICE.

HENRY J. CHILDS, OF NEW YORK, N. Y.

IMPROVEMENT IN COFFEE-POTS.

Specification forming part of Letters Patent No. 134,514, dated January 7, 1873.

*To all whom it may concern:*

Be it known that I, HENRY J. CHILDS, of the city and State of New York, have invented an Improvement in Coffee-Pots, of which the following is a specification:

In this coffee-pot there is a removable cylinder or cylinders, with two or more strainers, that retain the ground coffee or other material and allow the extract to pass through into the pot, the peculiarity of this part consisting in a removable strainer and funnel applied at the lower end of the cylinder to retain and support a piece of flannel or cloth, and regulate the speed with which the hot liquid escapes from the cylinder, and hence the strength of the extract. The strainers are made in such a manner as to support the flannel and prevent injury, and the parts can be removed and taken apart for cleaning. The cover is made with an internal flange, so that condensation drips inside the pot, but is received into a receptacle shaped to retain the same and prevent the water of condensation running back into the coffee-pot or escaping while the extract is being poured out.

In the drawing my improved coffee-pot is represented by a vertical section.

The outer case or pot is made of the bottom $a$ and sides $b$, and to these the spout $c$ and handle $d$ are applied, as usual. Within the pot is a cylinder or cylindrical support, $e$, that is united with the upper end of the coffee-pot by the conical partition $f$ that extends from the cylinder $e$ to the sides $b$. I provide the removable cylinder $g$ that is suspended or supported within the cylinder $e$, and receives at the bottom end the strainer $i$, band $l$, and funnel $n$. This strainer, band, and funnel are united together, but they are removable from the cylinder $g$ so as to allow for cleaning, and also for removing or replacing the flannel strainer $r$ that is confined at its edges between the band $l$ and the cylinder $g$. The strainer may be flat, convex, or corrugated. A second cylinder, $s$, strainer $t$, and cloth strainer $u$ are employed within the cylinder $g$, and a third might be used. The coffee is introduced within the inner cylinder and the hot water poured upon the same. The water is detained and only allowed to pass out from the cylinder $g$ into the pot slowly, in consequence of the contracted aperture at 3 at the lower end of the funnel $n$; hence the water will be kept in contact with the material a sufficient time to make the proper extract. The cylinder $e$ serves to retain the aroma of the extract when said cylinder is sufficiently long to extend into the liquid. The cover $o$ has an inner rim or flange, $p$, so that any dripping from condensation will pass in between the cylinder $e$ and case $b$, and be retained above the partition $f$, and not pass into the extract; and in order to prevent the condensed water running out when the pot is tipped in pouring the contents, I make use of a division, $w$, extending about three-quarters of the distance around the cylinder $e$, leaving an opening at the handle side, and the plug or cock at $x$ allows this water of condensation to be drawn off. The partition $f$ and division $w$ may be flat or conical in either direction.

It will be understood that the funnel $n$ and its small opening 3 serve to retain the deleterious matters of the coffee-grounds, and the same can be removed before pouring out the coffee.

I claim as my invention—

1. The removable cylinder $g$, detachable funnel $n$, band $l$, and strainers $i\ r$, in combination with the support $e$ and pot $a\ b$, as and for the purposes set forth.

2. The receptacle for condensation around the cylinder $e$, formed by the partition $f$ and division $w$, in combination with the flanged cover and plug or cock $x$, as and for the purposes specified.

Signed by me this 2d day of December, 1872.

HENRY J. CHILDS.

Witnesses:
GEO. T. PINCKNEY,
CHAS. H. SMITH.